US005683599A

United States Patent [19]

Ellis

[11] Patent Number: 5,683,599

[45] Date of Patent: Nov. 4, 1997

[54] MOUNTING SCHEME FOR A PLASMA ARC TORCH

[75] Inventor: Richard George Ellis, West Lebanon, N.H.

[73] Assignee: Centricut, LLC, West Lebanon, N.H.

[21] Appl. No.: 548,096

[22] Filed: Oct. 25, 1995

[51] Int. Cl.$^{6}$ .................................................. B23K 10/00

[52] U.S. Cl. .............................. 219/121.48; 219/121.39; 219/121.36

[58] Field of Search ......................... 219/121.48, 121.36, 219/121.39, 121.45, 74, 75

[56] References Cited

U.S. PATENT DOCUMENTS

| | | | |
|---|---|---|---|
| 2,768,279 | 10/1956 | Rava . | |
| 2,908,798 | 10/1959 | Cresswell . | |
| 3,148,263 | 9/1964 | Jensen | 219/75 |
| 3,641,308 | 2/1972 | Couch, Jr. et al. | 219/121 P |
| 3,813,510 | 5/1974 | Hatch | 219/121 P |
| 4,861,962 | 8/1989 | Sanders | 219/121.5 |
| 4,954,688 | 9/1990 | Winterfeldt | 219/121.5 |
| 5,023,425 | 6/1991 | Severance | 219/121.59 |

*Primary Examiner*—Mark H. Paschall
*Attorney, Agent, or Firm*—Peter Paul Mitrano

[57] ABSTRACT

A mounting device for a plasma arc torch which enables the plasma arc torch body to withstand impacts from objects or forces in its working environment which would otherwise require the entire plasma arc torch to be replaced; said device has a designed failure location, which thereby allows the user to replace only the failed mounting device instead of the entire plasma arc torch. An enhanced form of the invention includes a flexible mounting device that enables the plasma arc torch body to withstand impacts from objects or forces in its working environment and then return to its original position before failing at the designed failure location.

3 Claims, 4 Drawing Sheets

MOUNTING SCHEME FOR A PLASMA ARC TORCH

BACKGROUND OF INVENTION

Plasma arc torches are primarily used for cutting various metals. Plasma arc torches utilize a combination of gas or gases and electrodes that are capable of producing an extremely high temperature (in the range of 10,000 to 30,000 degrees Fahrenheit). The typical plasma arc torch is composed of an electrode, which acts as the cathode, and a nozzle, which creates a high velocity vortex of hot cutting plasma. The metal to be cut is a conductive material which acts as the anode of the plasma arc torch. The nozzle also acts as an anode during pilot arc transfers. The precise mounting of said components in the torch body is critical to the cutting process. Plasma arc torches are capable of cutting under water and above water in a normal atmosphere. A properly operating plasma arc torch has the ability to cut fairly precisely through metals. The operation of a plasma arc torch is dependent upon the thickness and type of metal, the electrical characteristics of voltage and current, the type and flow of gas or gases utilized, and the maintenance of the torch body in its undamaged state.

This invention relates in general to plasma arc cutting torches and the method of construction of the torch body or the outer casing, which holds in place the various components of the plasma arc cutting torch. Precise location of the nozzle of the torch is important for accurate cutting and proper torch operation. The distance between the nozzle of the torch and material must be constant. The alignment of the nozzle of the torch is to be perpendicular to the surface of the material to be cut, or in the case of beveling, at a fixed angle to the material. Any vibration of the torch will be reflected into the plasma stream and the cutting quality of the metal will be negatively affected. The result may be a cut finish which requires a secondary finishing operation.

Due to the force reflected onto the torch from the plasma being emitted at a hypersonic velocity and the requirement for the torch to remain in a fixed position, a rigid mounting scheme is required. The position of the torch and anion materials being cut must be moved during the cutting process. If the numerical control or the equipment operator attempts to move the torch and there is a collision between the torch and its surroundings, the result is often irreparable damage to the torch. One problem encountered with the prior art torches is that when an existing plasma arc torch collides with another object, the torch usually becomes worthless. With prior art torches, it is not possible to return the torch to its original working condition after an impact. The torch must be removed from its installation and be replaced by another torch. The replacement of another torch causes delays in the work place. In the past with prior art torches, the damaged torch usually has no worth and is discarded.

It is therefore the principal objective of this invention to eliminate the wasteful destruction of plasma arc torches by providing an improved mounting scheme that will absorb limited impact energy and/or isolate the damage to one part of the assembly. The invention will extend the life of the typical plasma torch that is exposed to other objects in the work place. The other form of the mounting scheme incorporates a flexible or replaceable member that will absorb limited impact or confine the resulting movement to an area that will not damage the working sections of the torch. The flexible mounting scheme allows the torch to be pushed by an impact and then returned to its operation. The present invention allows the user to replace only the failed mounting device instead of discarding the entire plasma arc torch. Thus, the invention will reduce the cost of doing business in the plasma arc cutting industry.

SUMMARY OF THE INVENTION

The invention is a mounting device that is designed to fail prior to the remaining portion of the plasma arc torch, thereby allowing the user to salvage the plasma arc torch by replacing only the mounting device. The invention includes two types of mounting devices: one involves a fixed rigid connection on the plasma arc torch, and the other involves a flexible connection that is constructed to withstand limited contact prior to failing and is able to return to its original position.

The invention comprises the connection of the mounting scheme device onto the torch body of the cutting system. The mounting device is designed so that it will move or fail in one particular location if subjected to excessive force. In the case of a rigid mounting scheme, an impact will fracture the mounting scheme device and prevent damage to other parts of the torch body. The invention is to be attached to the torch body in a manner which allows for easy replacement. When and if the invention is damaged, the damaged invention may be replaced and the torch returned to full service.

The rigid connection can be manufactured from any material that is rigid and contains a weak point or plane designed to fail before the overall plasma arc torch body. One of the more convenient forms of the device would permit users to screw the mounting device onto the body of the torch enabling easy repair. Another form of the invention would allow users to snap the mounting device into place. Another form would require users to glue or otherwise attach the mounting device to the torch body. It is desirable, although not critical, that the mounting device surfaces be in the same tubular plane as the torch body and fit adjacent to the torch body. It is also desirable that the mounting device fail in such a manner that the damaged mounting device is easily removed from the torch body in order to facilitate the efficient replacement of said mounting device with a new replacement mounting device.

In the case of a flexible mounting device, the torch body may be displaced by an object or force. The flexible mounting device will allow the torch to move to some degree without damage to the torch and allow the torch to return its original position before failing at the designed failure location. The mounting device can be made flexible through any means that allows for a give-and-take type action such as a cam mechanism, internal springs, external springs, collet mechanism with spring fingers or any combination of the same.

DESCRIPTION OF THE PREFERRED EMBODIMENTS

Figure 1:
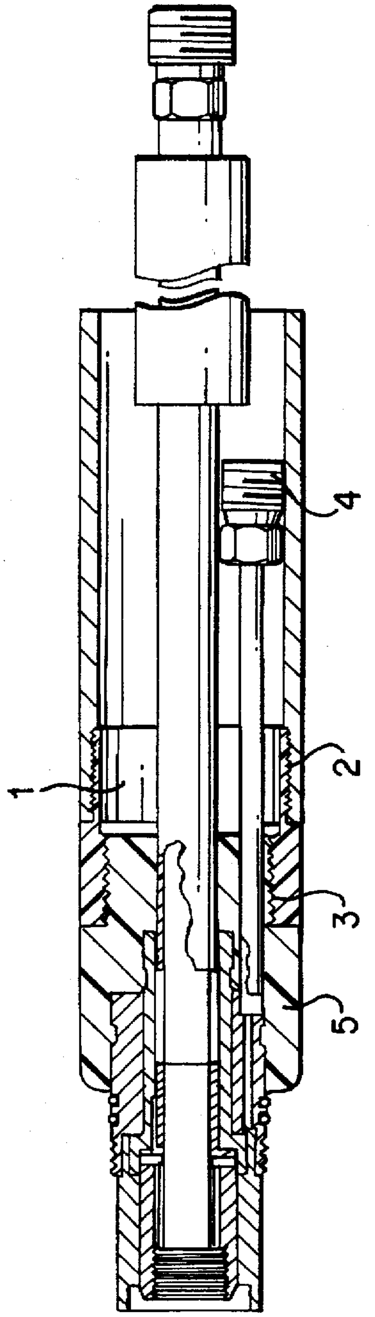
FIG. 1 is a sectioned, side view of a plasma arc torch illustrating the Mounting Scheme for a Plasma Arc Torch.

FIG. 1 shows the invention as a tubular-shape connector 1 with threaded ends 2 and 3 that can be attached to a portion of the body 5 of the plasma arc torch and of the cutting system equipment 4. FIG. 1 is the invention in its rigid form as compared to the flexible form of the invention (see FIGS. 3A, 3B, 4, 5 and 6). The shape of the invention is not limited to a tubular-shaped connector; the shape can be any arrangement that performs the function of the invention. Any method of attachment can be utilized to make the invention part of body of the plasma arc torch. The invention is able to withstand some impact before failing.

Figure 2B:
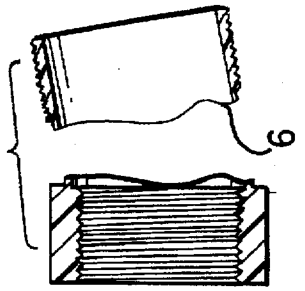
FIGS. 2A and 2B are details of the Mounting Scheme for a Plasma Arc Torch and the resulting damage that may occur.
Figure 2A:
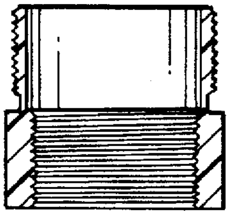

FIGS. 2A and 2B show the rigid form of the invention isolated from the plasma arc torch. The invention is designed to fail 6 before the remaining portion of the body of the plasma arc body 5. The key feature of the invention is that it fails along the line 6 that is designed as a weak point of the invention. An example of this failure plane 6 is shown in FIG. 2B. This enables a user to replace only the mounting device and reuse the remaining portion of the body of the plasma arc torch. The invention will save significant costs because the entire torch body will not be required to be replaced. The invention includes threads that are designed to further enable the user to efficiently replace the invention and place the plasma arc torch back in operation.

Figure 3A:
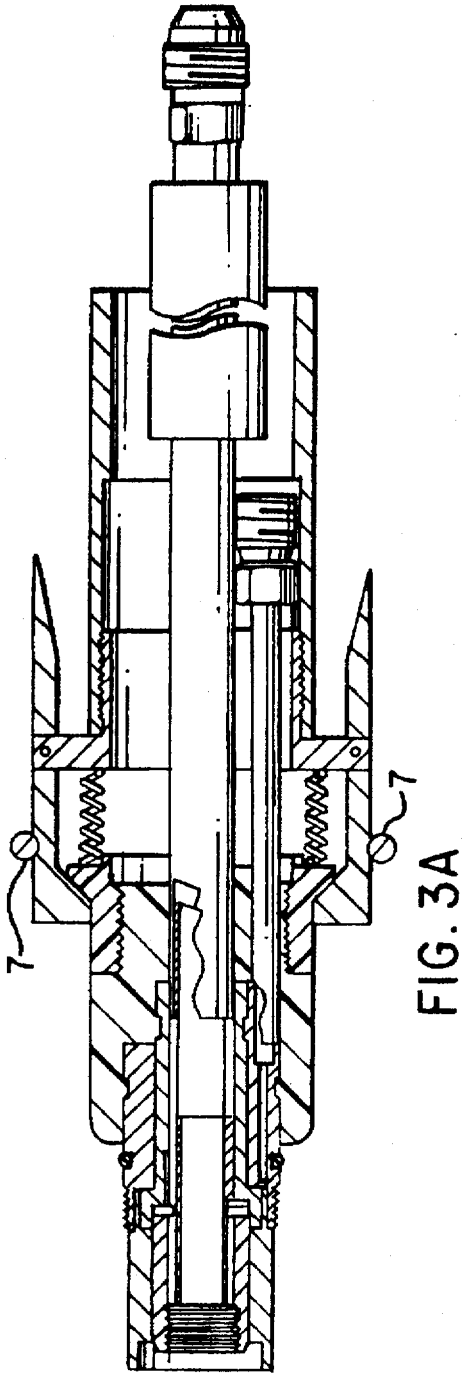
FIGS. 3A and 3B are details of the Mounting Scheme for a Plasma Arc Torch utilizing a cam mechanism.
Figure 3B:
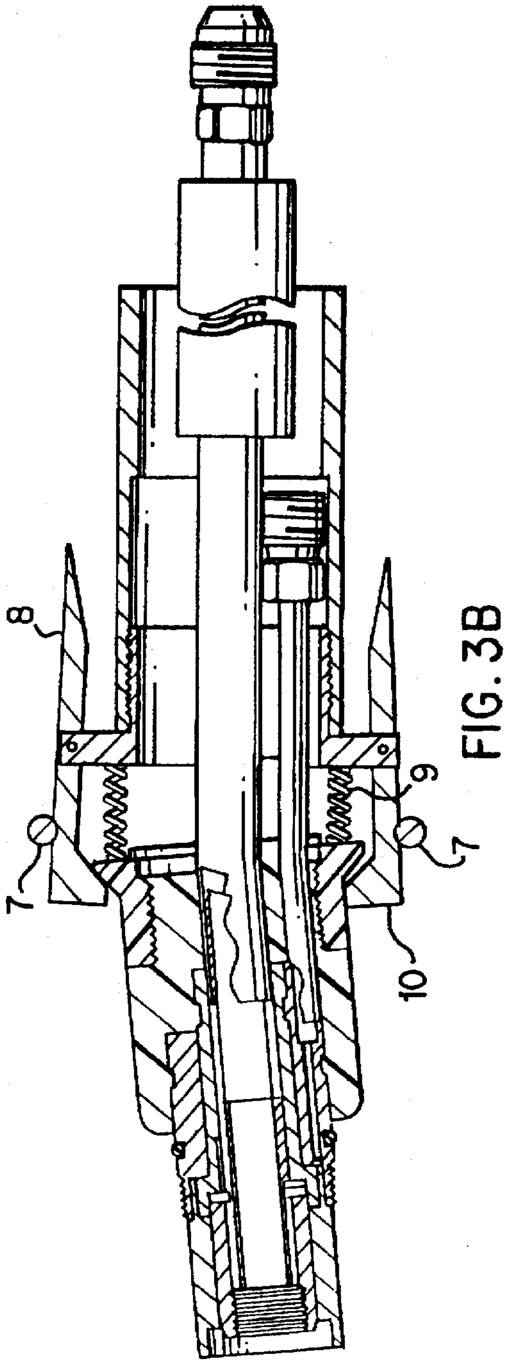

FIGS. 3A and 3B show a flexible form of the invention which is able to withstand more impact before failing. The flexible cam mechanism 10 shown in FIGS. 3A and 3B is an mounting device which allows the connector to return to its original position by springing back after impact as long as the impact does cause a complete failure of the torch body. There is a spring 7 that fits around the circumference of the cam mechanism which applies a tension to the movable arms 8 of the flexible connection. There are two interior springs 9 that form part of the connection of the torch body. The invention can include any number of said interior springs 9 as long as the torch body is adequately connected. In the case of a complete failure, the flexible connection is replaced.

Figure 4:
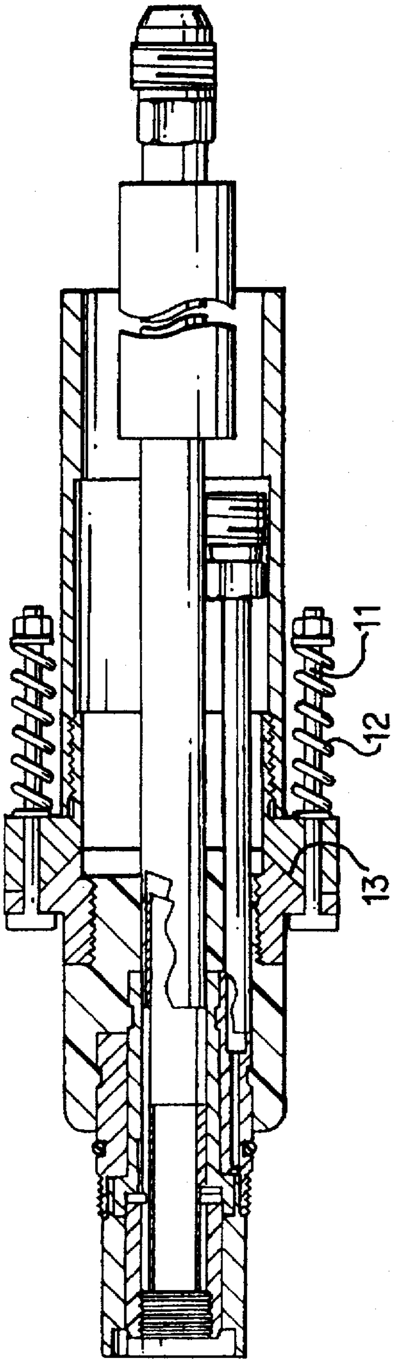
FIG. 4 is a detail of the Mounting Scheme for a Plasma Arc Torch utilizing an external spring mechanism.

FIG. 4 shows external rods 11 and springs 12 being utilized in the flexible mounting device. The rod 11 is fitted so that there is enough tolerance to permit the torch body to slide along the axis of the rod 11 against the pressure of the spring 12. The spring 12 is fitted around the rod 11 in a manner that the spring 12 stays in place under pressure. The joint at the connection 13 is shaped so that after an impact the torch body will slide into place.

Figure 5:
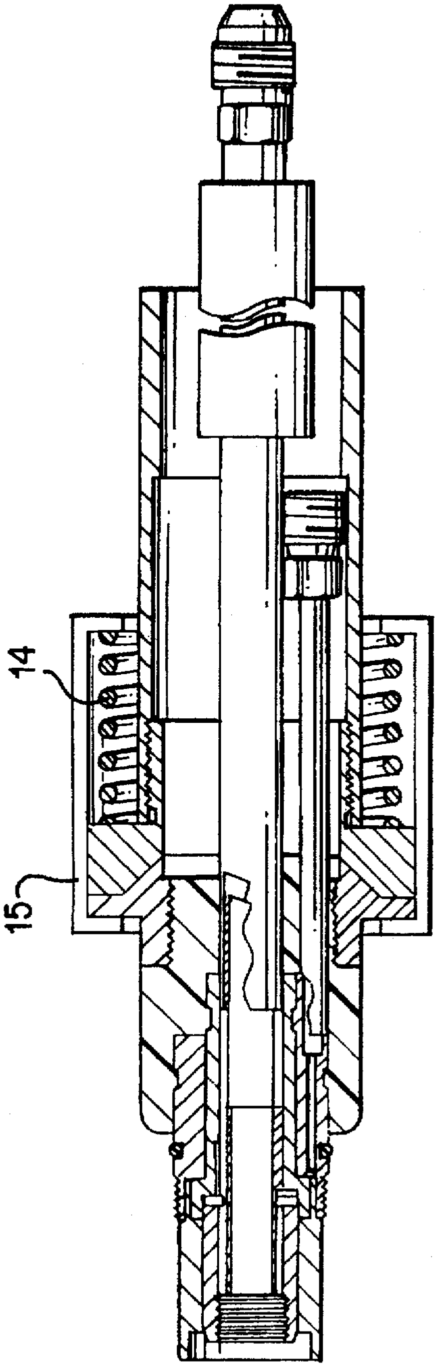
FIG. 5 is a detail of the Mounting Scheme for a Plasma Arc Torch utilizing an internal spring mechanism.

FIG. 5 shows internal springs 14 being utilized in the flexible mounting device. The internal springs 14 act in a manner similar to the external springs except there is no rod. The internal springs 14 are enclosed in a casing 15 which keeps the springs 14 in place and is flexible to permit the torch body to give upon an impact.

Figure 6:
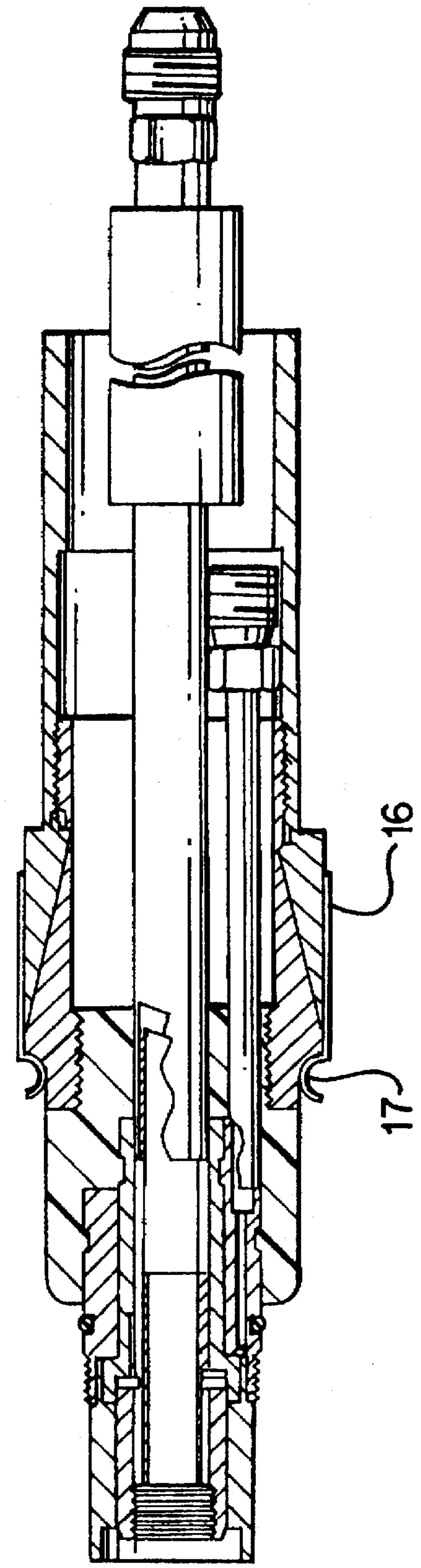
FIG. 6 is a detail of the Mounting Scheme for a Plasma Arc Torch utilizing a collet mechanism.

FIG. 6 shows a collet system with spring fingers 16 being utilized in the flexible mounting device. The spring fingers are able to snap into place 17 and return to their position upon impact. Moreover, the collect system with spring fingers 16 is more easily removed than the other flexible mounting devices.

I claim:

1. An improved mounting device for a plasma arc torch body or the outer casing of the plasma arc torch which holds in place the various components of the plasma arc torch which is attached to or made as a part of the plasma arc torch body wherein said mounting devise is replaceable and is built with a weaker section or plane which is designed to fail prior to the failure of the other portions of the plasma arc torch body when the plasma arc torch body collides with an object; said mounting device for a plasma arc torch body is adaptable to being mounted to a section of the plasma arc torch body with the remaining section of said plasma arc torch body being adaptable to being mounted to said mounting device and respectively separates and joins the individual sections of the plasma arc torch body at the location of said mounting device; said mounting device for a plasma arc torch body is adaptable to being located between the longitudinal ends of the plasma arc torch body preferably at or near a plane perpendicular to the longitudinal axis; however, the exact location of said mounting device can be modified as conditions warrant.

2. An improved mounting device of claim 1 which allows the plasma arc torch body to accept limited force and return to its original position.

3. An improved mounting device of claim 1 which is made flexible through a cam mechanism, internal springs, external springs, collet mechanism with spring fingers or any combination of the same being adaptable to the plasma arc torch body by connection to the plasma arc torch body such as by threading the cam mechanism, internal springs, external springs, collet mechanism with spring fingers or any combination of the same onto the plasma arc torch body; in addition, the same is also adaptable to being attached by screws, by snapping the same in place, by glue, by molding, or by welding the same to the plasma arc torch body; the improvement comprising of said mounting device for a plasma arc torch body being made flexible through the combination of the mounting device for a plasma arc torch body and said cam mechanism, internal springs, external springs, collet mechanism with spring fingers or any combination of the same being adaptable to the plasma arc torch body.

* * * * *